US009475426B1

(12) United States Patent
Bobo et al.

(10) Patent No.: US 9,475,426 B1
(45) Date of Patent: Oct. 25, 2016

(54) ILLUMINABLE VEHICLE FLOOR MAT ASSEMBLY

(71) Applicants: Demetris A. Bobo, Columbia Heights, MN (US); Adrian A. Stevens, Columbia Heights, MN (US)

(72) Inventors: Demetris A. Bobo, Columbia Heights, MN (US); Adrian A. Stevens, Columbia Heights, MN (US)

( * ) Notice: Subject to any disclaimer, the term of this patent is extended or adjusted under 35 U.S.C. 154(b) by 0 days.

(21) Appl. No.: 14/708,656

(22) Filed: May 11, 2015

(51) Int. Cl.
*B60Q 3/00* (2006.01)
*B60N 3/04* (2006.01)
*H05B 37/02* (2006.01)

(52) U.S. Cl.
CPC ............ *B60Q 3/007* (2013.01); *B60N 3/042* (2013.01); *H05B 37/0236* (2013.01)

(58) Field of Classification Search
CPC ... B60Q 3/007; B60N 3/042; H05B 37/0236
See application file for complete search history.

(56) References Cited

U.S. PATENT DOCUMENTS

| 5,434,013 A * | 7/1995 | Fernandez ............... B44C 5/00 313/504 |
| 5,848,830 A * | 12/1998 | Castle ............... A47G 27/0243 362/253 |
| 2016/0144774 A1* | 5/2016 | Alshalabi ............ B60Q 1/2696 362/545 |

\* cited by examiner

*Primary Examiner* — David V Bruce
(74) *Attorney, Agent, or Firm* — Dave Alan Lingbeck

(57) ABSTRACT

An illuminable vehicle floor mat assembly for synchronizing the lighting up of tape disposed in recessed portions in the transparent floor mat with the playing of music in the vehicle. The illuminable vehicle floor mat assembly includes a transparent floor adapted to rest upon the floor of a vehicle; and a lighting assembly attached to the transparent floor mat for displaying flashing and pulsating light with varying degrees of brightness and intensity.

12 Claims, 2 Drawing Sheets

ILLUMINABLE VEHICLE FLOOR MAT ASSEMBLY

BACKGROUND OF THE INVENTION

1. Field of the Invention

The present invention relates to transparent floor mats and more particularly pertains to a new illuminable vehicle floor mat assembly for synchronizing the lighting up of tape disposed recessed portion in the transparent floor mat with the playing of music in the vehicle.

2. Description of the Prior Art

The use of transparent floor mats is known in the prior art. More specifically, transparent floor mats heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a seat back that has a back frame, a cushion pad attached to the back frame, and a massaging unit having a plurality of massaging elements. Another prior art includes a sound-controllable multistage massager equipped with LCD device comprising a massage mattress and a control device, wherein the control device comprises at least a microprocessor, a power supply device, a heating device, a sound controllable device, a motor driving device, a LCD driving device, and a key-in device. The massage mattress contains plural motors cooperative with the control device to achieve massage efficacy. Also another prior art includes a massaging apparatus utilizing a hand held controller including a microcontroller to actuate a plurality of vibrators positioned within a cushion using pulse width modulated signals. While these devices fulfill their respective, particular objectives and requirements, the aforementioned patents do not disclose a new illuminable vehicle floor mat assembly.

SUMMARY OF THE INVENTION

The general purpose of the present invention, which will be described subsequently in greater detail, is to provide a new illuminable vehicle floor mat assembly which has many of the advantages of the transparent floor mats mentioned heretofore and many novel features that result in a new illuminable vehicle floor mat assembly which is not anticipated, rendered obvious, suggested, or even implied by any of the prior art transparent floor mats, either alone or in any combination thereof. The present invention includes a transparent floor mat; and a lighting assembly attached to the transparent floor mat for displaying flashing and pulsating light with varying degrees of brightness and intensity. None of the prior art includes the combination of the elements of the present invention.

There has thus been outlined, rather broadly, the more important features of the illuminable vehicle floor mat assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new illuminable vehicle floor mat assembly which has many of the advantages of the transparent floor mats mentioned heretofore and many novel features that result in a new illuminable vehicle floor mat assembly which is not anticipated, rendered obvious, suggested, or even implied by any of the prior art transparent floor mats, either alone or in any combination thereof.

Still another object of the present invention is to provide a new illuminable vehicle floor mat assembly for synchronizing the lighting up of tape disposed in recessed portions in the floor mat with the playing of music in the vehicle.

Still yet another object of the present invention is to provide a new illuminable vehicle floor mat assembly that enhances the beat of the music being played on the stereo by lighting up the design in concert with the beat of the music.

Even still another object of the present invention is to provide a new illuminable vehicle floor mat assembly that displays an attractive array of lighting on the floor mat during the playing of music on the stereo.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
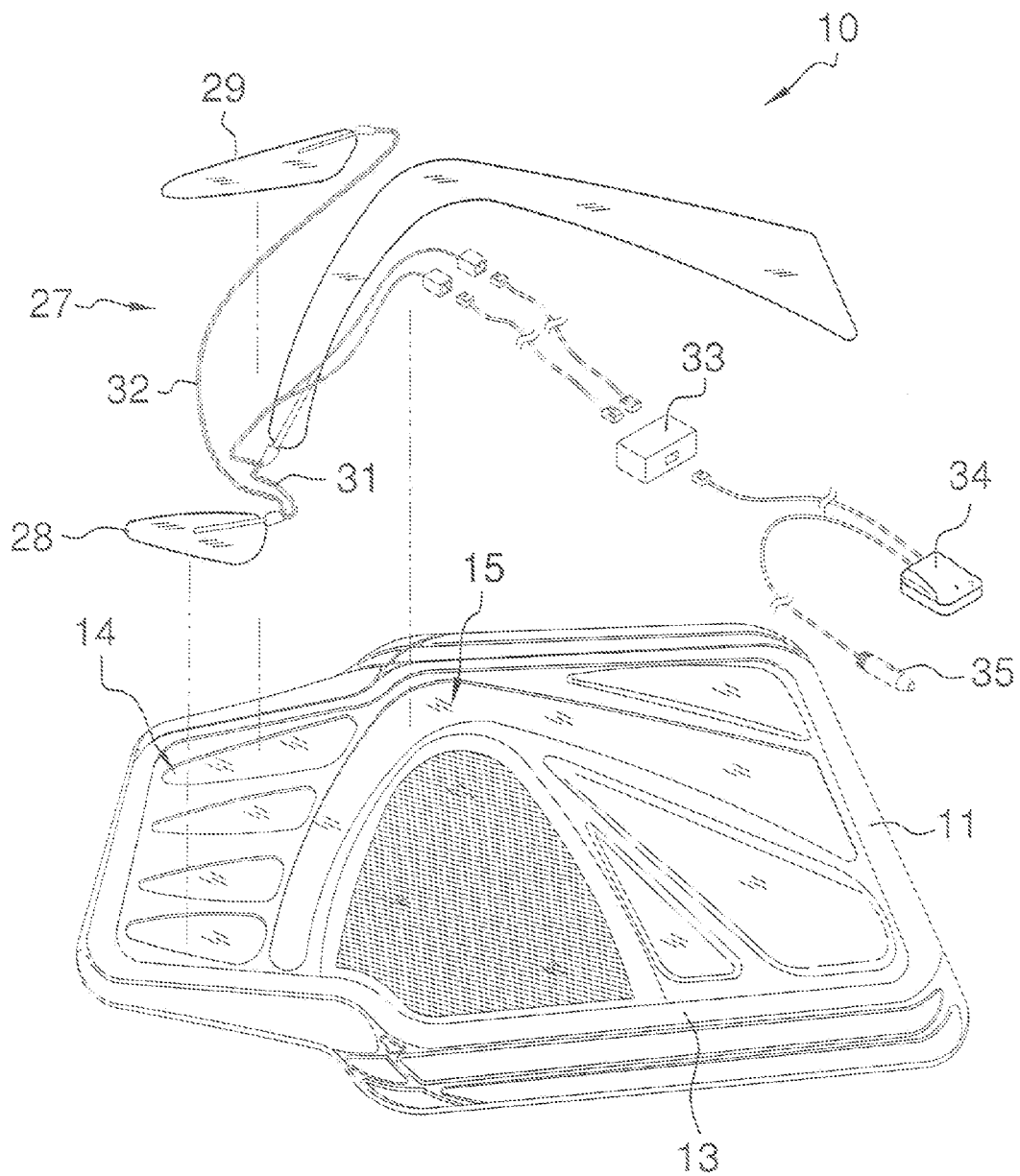
FIG. 1 is an exploded bottom perspective view of the floor mat assembly.
Figure 2:
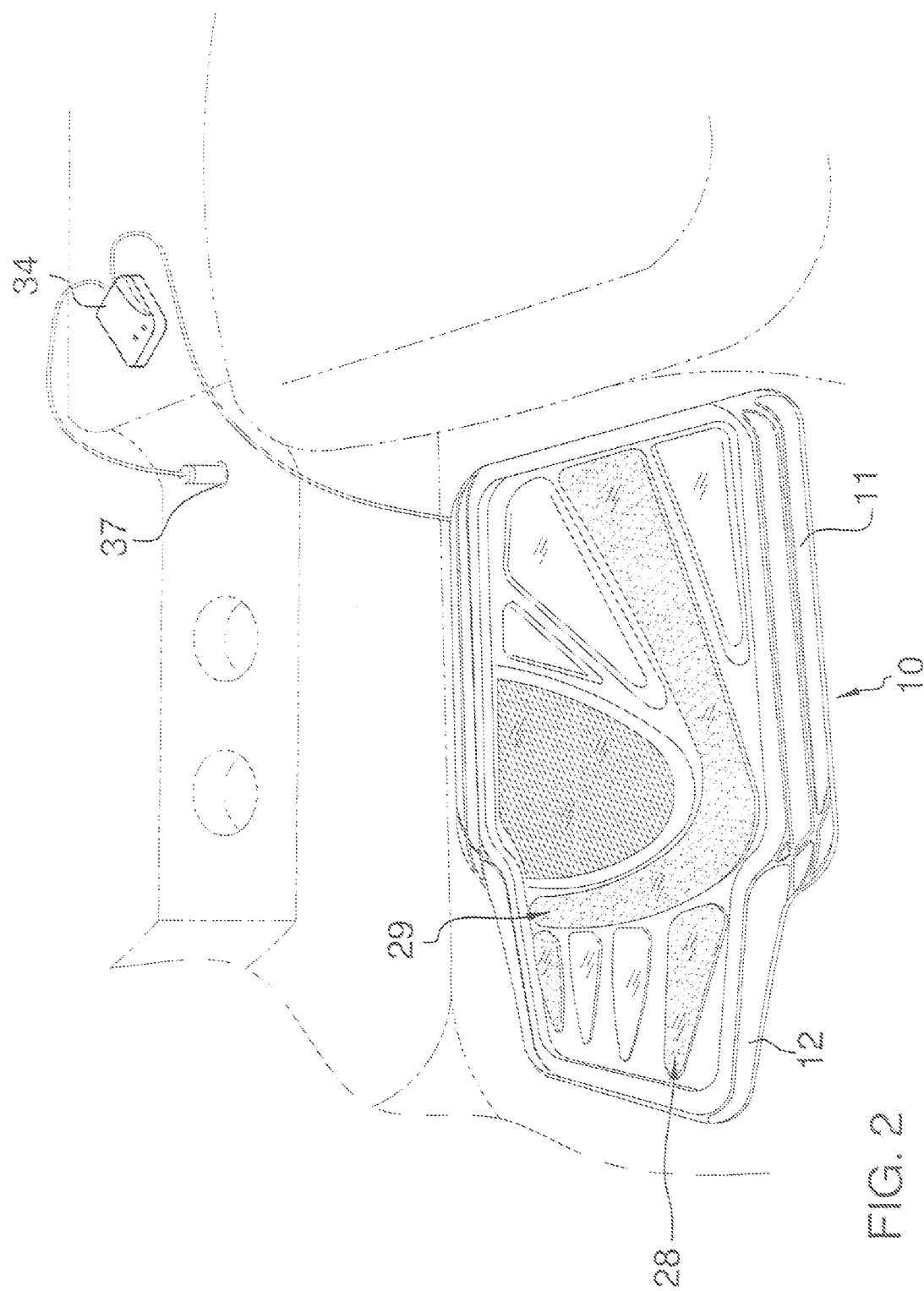
FIG. 2 is top perspective view of the floor mat assembly with a partial dotted outline of a center column for a vehicle with a cigarette lighter jack.

With reference now to the drawings, and in particular to FIGS. 1 through 2 thereof, a new illuminable vehicle floor mat assembly embodying the principles and concepts of the present invention and generally designated by the reference numeral 10 will be described.

As best illustrated in FIGS. 1 through 2, the illuminable vehicle floor mat assembly 10 may generally comprise a transparent floor mat 11 preferably made of elastomeric material and having a top side 12 and bottom side 13 and adapted to rest upon a floor of a vehicle, and may further comprise a lighting assembly 27 conventionally attached to the transparent floor mat 11 to effect flashing and pulsating light with varying degrees of brightness and intensity. The floor mat 11 may have recessed portions 14, 15 disposed in the bottom side 13 with the recessed portions 14, 15 forming selected designs.

As shown in FIGS. 1 and 2, the lighting assembly 27 may include one or more strips of electroluminescent tape 28-29 conventionally disposed and adhered with adhesive to the bottom side 13 of the transparent floor mat 11. The one or more strips of electroluminescent tape 28-30 may be conventionally disposed in one or more of the recessed portions 14, 15 and may be visible through and from the top side 12 of the floor mat 11. The lighting assembly 27 may include one or more electrical wires 31-32 in conventional communication with the one or more strips of electroluminescent tape 28-29. The one or more electrical wires 31-32 may be conventionally fastened to the bottom side 13 of the transparent floor mat 11. The lighting assembly 27 may further include a sound activated inverter 34 in conventional communication with the one or more electrical wires 31-32 for converting sound from a vehicle stereo to electrical current with varying degrees of current intensity which energize the one or more strips of electroluminescent tape 28-29 to emit light, flashing and pulsating in concert with the sound at varying degrees of brightness. The lighting assembly 27 may also include a cigarette lighter plug 35 conventionally connected to the sound activated inverter 34 for transmitting electrical current from a power source such as the vehicle's battery to energize the one or more strips of electroluminescent tape 28-29.

As illustrated in FIGS. 1 and 2, the one or more strips of electroluminescent tape 28-29 may include strips of electroluminescent tape 28-29 conventionally disposed and adhered in a plurality of the recessed portion in the bottom side 15 of the floor mat. The lighting assembly 27 may include electrical wires 31-32 in conventional communication with the strips of electroluminescent tape 28-29. The electrical wires 31-32 may be conventionally fastened to the bottom side of the transparent floor mat 11. The lighting assembly 27 may further include an electrical wire splitter 33 conventionally connected to the electrical wires 3-32, and may also include the sound activated inverter 34 in conventional communication with the electrical wire splitter 33 for converting sound to electrical current with varying degrees of current intensity which energize the strips of electroluminescent tape 28-29 to emit light, flashing and pulsating in concert with the sound at varying degrees of brightness. The lighting assembly 27 may also include the cigarette lighter plug 35 conventionally connected to the sound activated inverter 34 for transmitting electrical current from the power source to energize the strips of electroluminescent tape 28-29.

In use, the user places the transparent floor mat 11 upon the floor of the vehicle seat 36 with the one or more strips of electroluminescent tape 28-29 visible through the floor mat, and plugs in the cigarette lighter plug 35 into the cigarette lighter jack 37 and adjusts the intensity of the sound activated inverter 34 which has a microphone to capture the sounds such as music played from the vehicle stereo. The sound activated inverter 34 converts the sound it receives into electrical current which is transmitted to the one or more strips of electroluminescent tape 28-29; whereupon the one or more strips of electroluminescent tape 28-29 emits light with the intensity and brightness in concert with the sound received by the sound activated inverter 34. The light may flash or pulsate in rhythm with the sound.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the illuminable vehicle floor mat assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An illuminable vehicle floor mat assembly comprising:
   a transparent floor mat having a top side and a bottom side and adapted to rest upon a floor of a vehicle; and
   a lighting assembly attached to the floor mat for displaying flashing and pulsating light with varying degrees of brightness and intensity.

2. The illuminable vehicle floor mat assembly as described in claim 1, wherein the floor mat has recessed portions disposed in the bottom side with the recessed portions forming selected designs.

3. The illuminable vehicle floor mat assembly as described in claim 2, wherein the lighting assembly includes one or more strips of electroluminescent tape disposed and adhered to the bottom side of the floor mat.

4. The illuminable vehicle floor mat assembly as described in claim 3, wherein the one or more strips of electroluminescent tape is disposed in one or more of the recessed portions and is visible through and from the top side of the vehicle floor mat.

5. The illuminable vehicle floor mat assembly as described in claim 4, wherein the lighting assembly includes one or more electrical wires in communication with the one or more strips of electroluminescent tape, wherein the one or more electrical wires are fastened to the bottom side of the vehicle floor mat.

6. The illuminable vehicle floor mat assembly as described in claim 5, wherein the lighting assembly further includes a sound activated inverter in communication with the one or more electrical wires and the one or more strips of electroluminescent tape and converting sound from a vehicle stereo to electrical current with varying degrees of current intensity which energizes the one or more strips of electroluminescent tape to emit light, flashing and pulsating in concert with the sound at varying degrees of brightness.

7. The illuminable vehicle floor mat assembly as described in claim 6, wherein the lighting assembly also includes a cigarette lighter plug connected to the sound activated inverter for transmitting electrical current from a power source to energize the one or more strips of electroluminescent tape.

8. The illuminable vehicle floor mat assembly as described in claim 3, wherein the one or more strips of electroluminescent tape includes a plurality of the strips of electroluminescent tape disposed in the recessed portions and is visible through and from the top side of the vehicle floor mat.

9. The illuminable vehicle floor mat assembly as described in claim 8, wherein the lighting assembly further includes an electrical wire splitter connectable to a plurality of the electrical wires, and also includes a sound activated inverter in communication with the electrical wire splitter and converting sound to electrical current with varying degrees of current intensity which energize the strips of electroluminescent tape to emit light, flashing and pulsating in concert with the sound at varying degrees of brightness.

10. The illuminable vehicle floor mat assembly as described in claim 9, wherein the lighting assembly also includes a cigarette lighter plug connected to the sound activated inverter for transmitting electrical current from a power source to energize the strips of electroluminescent tape.

11. A method of using an illuminable vehicle floor mat assembly comprising the steps of:
   providing a transparent floor mat and a lighting assembly including one or more strips of electroluminescent tape attached to a bottom side of the transparent floor mat and also including a sound activated inverter connected to the one or more strips of electroluminescent tape and further including a cigarette lighter plug connected to the sound activated inverter;
   disposing the transparent floor mat upon a floor of a vehicle with the one or more strips of electroluminescent tape visible through the floor mat;
   connecting the cigarette lighter plug to a cigarette lighter of the vehicle;
   activating a sound system of the vehicle with the sound activated inverter converting sound received from the sound system to electrical current; and
   lighting the one or more strips of electroluminescent tape using the electrical current.

12. The method of using an illuminable vehicle floor mat assembly as described in claim 11, wherein the lighting the one or more strips includes variably flashing of the one or more strips of electroluminescent tape in rhythmic concert with the sound from the sound system.

* * * * *